United States Patent
Konno

(10) Patent No.: US 12,445,714 B2
(45) Date of Patent: Oct. 14, 2025

(54) INFORMATION PROCESSING APPARATUS, IMAGE CAPTURING SYSTEM, METHOD, AND NON-TRANSITORY COMPUTER-READABLE STORAGE MEDIUM FOR SELECTING A TRAINED MODEL

(71) Applicant: CANON KABUSHIKI KAISHA, Tokyo (JP)

(72) Inventor: Yu Konno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 231 days.

(21) Appl. No.: 17/969,737

(22) Filed: Oct. 20, 2022

(65) Prior Publication Data

US 2023/0125410 A1   Apr. 27, 2023

(30) Foreign Application Priority Data

Oct. 26, 2021 (JP) ................. 2021-174824

(51) Int. Cl.
   *H04N 23/63* (2023.01)
   *G06V 10/70* (2022.01)
   *G06V 10/94* (2022.01)
   *H04N 23/61* (2023.01)

(52) U.S. Cl.
   CPC ........... *H04N 23/632* (2023.01); *G06V 10/70* (2022.01); *G06V 10/945* (2022.01); *H04N 23/61* (2023.01)

(58) Field of Classification Search
   CPC ...... H04N 23/632; H04N 23/61; G06V 10/70; G06V 10/945
   USPC ........................................ 348/222.1
   See application file for complete search history.

(56) References Cited

U.S. PATENT DOCUMENTS

| | | | |
|---|---|---|---|
| 10,467,729 B1 * | 11/2019 | Perera ................. | G06T 3/4046 |
| 10,939,044 B1 * | 3/2021 | Tagra ................... | H04N 23/951 |
| 2014/0098255 A1 * | 4/2014 | Miura .................. | G06F 3/0416 |
| | | | 348/208.99 |
| 2019/0251391 A1 * | 8/2019 | Kawabayashi ...... | G06V 10/945 |
| 2019/0266392 A1 * | 8/2019 | Watanabe ............ | G06V 40/103 |
| 2022/0109795 A1 * | 4/2022 | Tsunoda ............... | G06V 20/42 |
| 2022/0366677 A1 * | 11/2022 | Kim ...................... | G06V 20/70 |

(Continued)

FOREIGN PATENT DOCUMENTS

JP   2018-207309 A   12/2018

OTHER PUBLICATIONS

Girshick, R. et al., "Rich Feature Hierarchies for Accurate Object Detection and Semantic Segmentation" arXiv:1311.2524v5 (Oct. 2014) pp. 1-21.

(Continued)

*Primary Examiner* — Usman A Khan
(74) *Attorney, Agent, or Firm* — Carter, DeLuca & Farrell LLP

(57) ABSTRACT

A display unit switches which trained model, among a plurality of trained models whose granularities of detection for an object to be detected from an image are different from each other, is a trained model of interest, and displays on a screen a result of detection by the trained model of interest. A determination unit determines an object on which a predetermined process is to be performed based on a user operation on the result of detection by the trained model of interest.

19 Claims, 6 Drawing Sheets

(56) References Cited

U.S. PATENT DOCUMENTS

2022/0417428 A1* 12/2022 Jeon ................... H04N 5/265

OTHER PUBLICATIONS

Liu, W. et al., "SSD: Single Shot MultiBox Detector" arXiv:1512.02325v8 (Dec. 2016) pp. 1-17.
Redmon, J. et al., "You Only Look Once: Unified, Real-Time Object Detection" arXiv:1506.02640v1 (Jun. 2015) pp. 1-9.
Notice of Reasons for Refusal issued by the Japanese Patent Office on Jun. 27, 2025 in corresponding JP Patent Application No. 2021-174824, with English translation.
Bak, S. et al., "Retrieval system for person re-identification" 2014 International Conference on Computer Vision Theory and Applications (VISAPP), (2014) pp. 732-738, vol. 2.

* cited by examiner

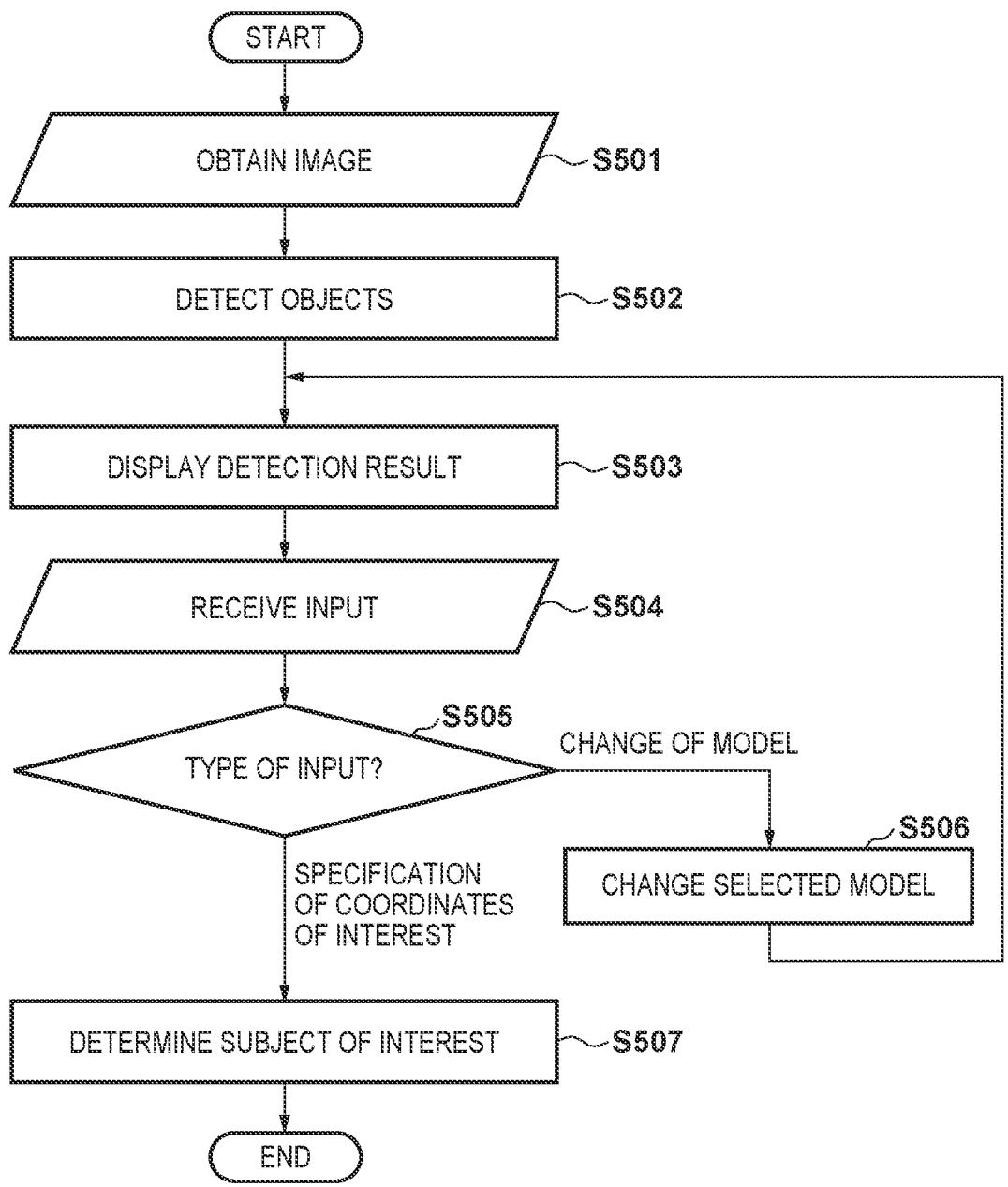

INFORMATION PROCESSING APPARATUS, IMAGE CAPTURING SYSTEM, METHOD, AND NON-TRANSITORY COMPUTER-READABLE STORAGE MEDIUM FOR SELECTING A TRAINED MODEL

BACKGROUND OF THE INVENTION

Field of the Invention

The present invention relates to an information processing apparatus, an image capturing system, a method, and a non-transitory computer-readable storage medium.

Description of the Related Art

Recently, with the development of deep learning, detection accuracy for when detecting objects from an image has been greatly improved. Conventionally, detection of an object from an image has been realized by making a neural network (hereinafter, NN) or the like to learn objects belonging to a specific category, such as face or human body. In deep learning, it is possible to make an NN learn a concept that is more abstract than that learned by a conventional method. Deep learning enables multi-object detection in which objects of various categories are detected simultaneously by making an NN learn "objectness" using information of objects belonging to various categories.

There are techniques for detecting multiple objects from an image using deep learning. See, for example, "Rich Feature Hierarchies for Accurate Object Detection and Semantic Segmentation, Ross Girshick et al., 2014". "SSD: Single Shot MultiBox Detector, Wei Liu et al., 2015" and "You Only Look Once: Unified, Real-Time Object Detection, Joseph Redmon et al., 2015". Further, there is a need for a user, when capturing a subject, to arbitrarily select a subject to be a target of a tracking process and an autofocus process (hereinafter, AF process) on a screen of a digital camera, and a function of selecting a subject on a screen is widely implemented in existing products.

Japanese Patent Laid-Open No. 2018-207309 describes that a subject to be a target of an AF process is specified according to a touch position on a touch panel and a switch to an optimal AF process is performed in coordination with the specified subject.

SUMMARY OF THE INVENTION

The present invention in its one aspect provides an information processing apparatus comprising a display unit configured to switch which trained model, among a plurality of trained models whose granularities of detection for an object to be detected from an image are different from each other, is a trained model of interest, and display on a screen a result of detection by the trained model of interest, a determination unit configured to determine an object on which a predetermined process is to be performed based on a user operation on the result of detection by the trained model of interest.

The present invention in its one aspect provides an information processing apparatus comprising a display unit configured to switch which of a result of detection by a trained model for detecting an object from an image and an integrated result of detection in which results of detection have been integrated is to be displayed for respective user operations, and display on a screen the result of detection or the integrated result of detection, and a determination unit configured to determine an object or another object, which corresponds to the integrated result of detection, on which a predetermined process is to be performed based on a user operation on the result of detection or the integrated result of detection.

The present invention in its one aspect provides a method comprising switching which trained model, among a plurality of trained models whose granularities of detection for an object to be detected from an image are different from each other, is a trained model of interest, and displaying on a screen a result of detection by the trained model of interest, determining an object on which a predetermined process is to be performed based on a user operation on the result of detection by the trained model of interest.

The present invention in its one aspect provides a non-transitory computer-readable storage medium storing a program that, when executed by a computer, causes the computer to perform a method comprising switching which trained model, among a plurality of trained models whose granularities of detection for an object to be detected from an image are different from each other, is a trained model of interest, and displaying on a screen a result of detection by the trained model of interest, determining an object on which a predetermined process is to be performed based on a user operation on the result of detection by the trained model of interest.

Further features of the present invention will become apparent from the following description of exemplary embodiments (with reference to the attached drawings).

BRIEF DESCRIPTION OF THE DRAWINGS

FIG. 5 is a flowchart of a process for determining a subject of interest according to the second embodiment.

DESCRIPTION OF THE EMBODIMENTS

Figure 1:
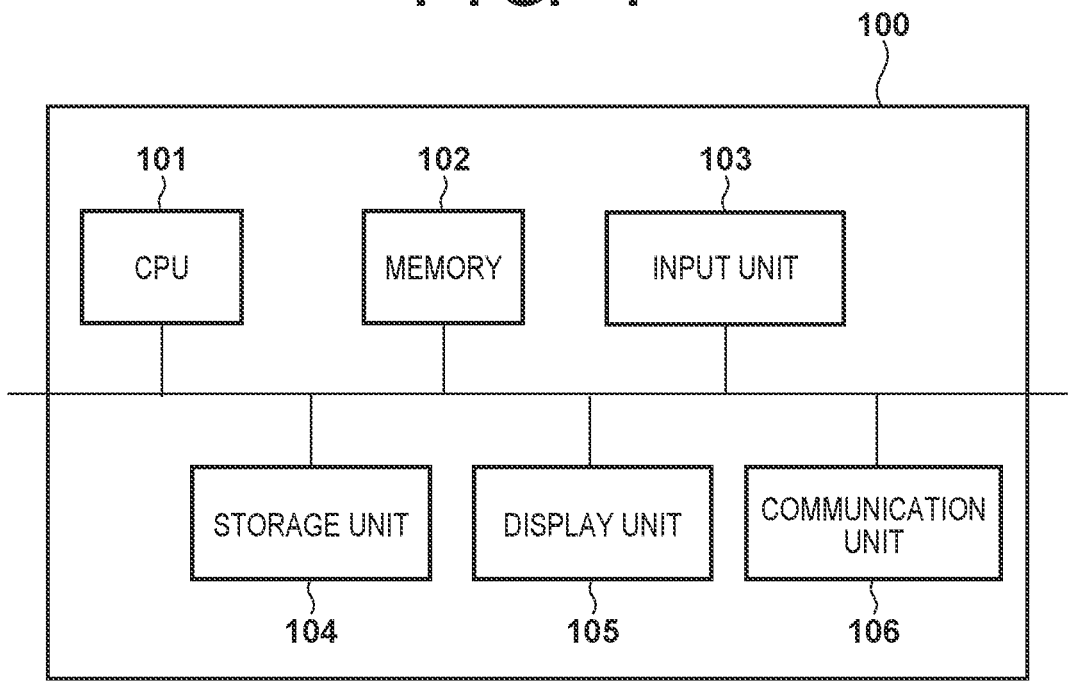
FIG. 1 is a diagram illustrating an example of a hardware configuration of an information processing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

According to the present invention, it is possible for a user, when selecting an object or a specific part of an object in an image, to select an object or a specific part of an object as intended.

First Embodiment

A first embodiment displays on a screen a result of detection by a trained model of interest, which is one of a plurality of trained models whose granularities of detection for an object to be detected from an image are different from each other. The first embodiment switches each trained model, among the plurality of trained models, whose result of detection is displayed, and determines an object on which a predetermined process is to be performed based on a user operation on the respective detection result. Here, each of unspecified and various objects, such as a person, an animal, and a vehicle, that is captured by an image capturing apparatus (e.g., a digital camera) is, as a whole, referred to as an "object". Meanwhile, a part of an object, such as a part (a hand or a foot) of a person and a part (headlight or tire) of a motorcycle, is called a "specific part". The first embodiment displays detection frames of objects or detection frames of specific parts on a screen and a viewfinder of the image capturing apparatus (e.g., a digital camera), and a user selects an object or a specific part on the screen.

The first embodiment causes the image capturing apparatus to perform, for example, a tracking process, an AF process, or a counting process as a predetermined process on an object or a specific part selected by the user on the screen. The first embodiment provides a user interface (UI) that allows a user to select an object or a specific part as intended. In the first embodiment, two trained models (a trained model for detecting objects and for a trained model for detecting specific parts) are held, but three or more trained models each having a different levels of granularity of detection for an object in may be held. A granularity of detection is defined as a size of a region of interest for an object. In addition, the present invention is not limited to performing a tracking process and performing an AF process for an object or a specific part selected by the user, and a process for counting the number of objects or counting the number of specific parts may be performed.

FIG. 1 is a diagram illustrating an example of a hardware configuration of an information processing apparatus. An information processing apparatus 100 includes a CPU 101, a memory 102, an input unit 103, a storage unit 104, a display unit 105, and a communication unit 106. The information processing apparatus 100 is a general-purpose apparatus capable of image processing and includes, for example, a camera, a smartphone, a tablet, a PC, and the like. The information processing apparatus 100 may be used in combination with an image capturing apparatus (not illustrated) for capturing an object, and an image capturing system (not illustrated) includes the image capturing apparatus and the information processing apparatus 100.

The CPU 101 is an apparatus for controlling each unit of the information processing apparatus 100 and performs various processes by executing programs and data stored in the memory 102.

The memory 102 is a storage apparatus for storing various kinds of data, a start-up program, and the like and includes, for example, a ROM. The memory 102 provides a work area to be used for when the CPU 101 performs various processes and includes, for example, a RAM.

The input unit 103 is an apparatus for receiving input of various instructions from the user and includes, for example, a mouse, a keyboard, a joystick, and various operation buttons.

The storage unit 104 is a storage medium for storing various kinds of data and data for training an NN and includes, for example, an HDD, an SSD, a flash memory, optical media, and the like.

The display unit 105 is an apparatus for displaying various kinds of information processed by the CPU 101 and includes, for example, a user interface (UI), such as a liquid crystal screen, an organic EL screen, a contact or non-contact touch panel, and an aerial display. The display unit 105 displays images captured by the image capturing apparatus (not illustrated), data received from a server (not illustrated), and the like on the screen. When the display unit 105 is a touch panel, the user inputs various instructions to the CPU 101 by touching the touch panel.

The communication unit 106 is an apparatus for exchanging data of each unit in the information processing apparatus 100 and includes, for example, a cable, a bus, a wired LAN, a wireless LAN, and the like.

Figure 2:
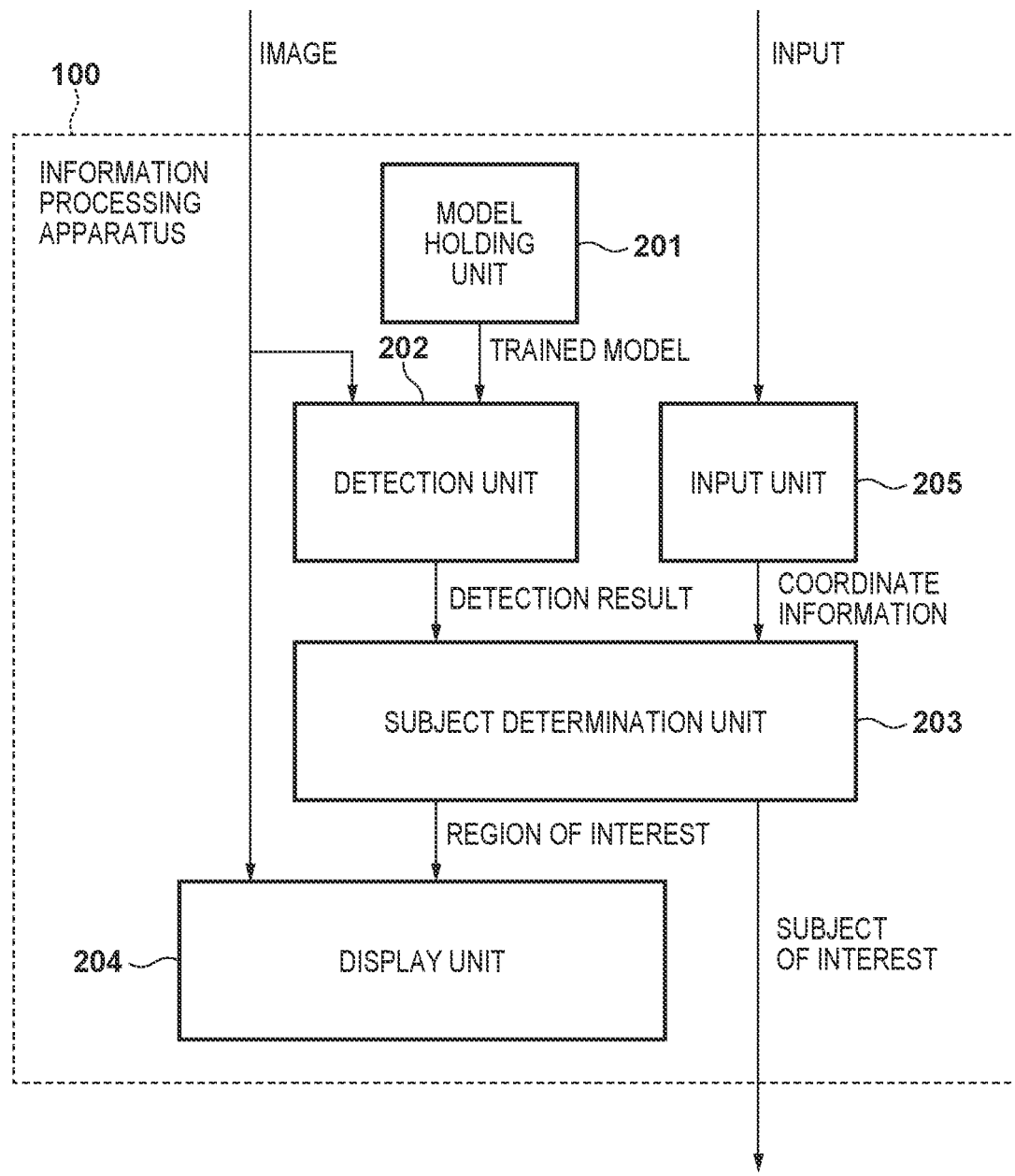
FIG. 2 is a diagram illustrating an example of a functional configuration of the information processing apparatus according to a first embodiment.

FIG. 2 is a diagram illustrating an example of a functional configuration of the information processing apparatus according to the first embodiment. The information processing apparatus 100 includes a model holding unit 201, a detection unit 202, a subject determination unit 203, a display unit 204, and an input unit 205.

The model holding unit 201 holds trained models related to at least two or more machine learning models. The model holding unit 201 holds, for example, two machine learning models whose sizes of a region of interest to be referenced when detecting objects or detecting objects parts of an object are different from each other (granularities of detection for an object are different from each other). Here, "machine learning model" means a learning model according to a machine learning algorithm, such as deep learning (DL). Also, "trained model" means a machine learning model according to an arbitrary machine learning algorithm that has been trained in advance using appropriate training data. However, that does not mean that the trained model does not learn anything more than what it has already learned and can also perform additional learning.

"Training data" means data for training a machine learning model. The training data is configured by a pair of input data (e.g., an image) in which objects or specific parts belonging to various categories are captured and GT data in which regions of objects or specific parts in an image are displayed in frames. The input data is an image captured in advance by the image capturing apparatus. A ground truth (GT) is ground truth data in which ground truth information has been added in advance to objects or specific parts in an image. The "various categories" means categories such as organisms including people, insects, and animals, man-made things including automobiles and motorcycles, and includes all objects to be targets of detection.

The two trained models are realized by a method of training a machine learning model using a plurality of training data whose sizes of a region of interest for when detecting objects are different from each other, a method of adjusting various hyperparameters at the time of training, and the like. The model holding unit 201 provides GT data A and GT data B for one input data (image) as examples of a plurality of training data whose sizes of a region of interest are different from each other when detecting objects. The GT data A is a GT in which frames have been added to a region of each object (e.g., person or car) in the input data (image) and is used for training a model whose region of interest for an object is large. The GT data B is a GT in which frames have been added to a region of each specific part of an object (e.g., face of a person or tire of a car) in the input data (image) and is used for training a model whose region of interest for an object is small.

When a machine learning model is trained using the input data (image) and the GT data A and the input data and the GT data B, respectively, a model A trained with the GT data A detects objects, and a model B trained with the GT data B detects specific parts. In this way, a trained model for detecting objects or a trained model for detecting specific parts is obtained by providing a plurality of training data whose region of interest size when detecting an object differs and then training the machine learning model with the training data.

The detection unit 202 detects objects or detects specific parts from an image using a known pattern recognition technique or recognition technique that uses machine learning and obtains a result of detecting objects or a result of detecting specific parts. Here, "detection of objects or specific parts" means specifying the positions of objects or of specific parts belonging to various categories from an image using either of the two trained models held by the model holding unit 201.

The result of detecting objects or specific parts is expressed by coordinate information on the image and likelihoods representing probabilities of there being an object or a specific part. The coordinate information on the image is represented by a center position of a rectangular region on the image and a size of the rectangular region. The coordinate information on the image may include information related to an angle of rotation of an object or a specific part.

The subject determination unit 203 uses detection frames of objects or specific parts detected by a trained model of the detection unit 202 and coordinate information received from the input unit 205, which will be described later, to determine an object or a specific part specified by the user on the screen. The detection frames of objects or specific parts are represented as arbitrary shapes, such as rectangles or ovals, on the image. The display unit 204 displays on the screen of the display unit 105 the detection frames of objects or specific parts superimposed on the image. The subject determination unit 203 stores coordinate information of an object or a specific part selected by the user on the screen in the storage unit 104. Further, the subject determination unit 203 controls a tracking process, an AF process, and a counting process by instructing the image capturing apparatus (not illustrated) to perform at least one of these processes on a determined object or specific part.

The display unit 204 simultaneously displays the detection frames of objects or specific parts detected by the detection unit 202 and an object of interest or a specific part of interest determined by the subject determination unit 203 on the screen of the display unit 105. Here, the display unit 204 changes a thickness and a color of detection frames of objects or specific parts and a thickness and a color of a frame of the object of interest or the specific part of interest to thereby display them on the screen in a distinguishable format.

The input unit 205 detects a position at which the user's finger contacts the touch panel of the display unit 105 and outputs coordinate information corresponding to the position to the subject determination unit 203.

Figure 3:
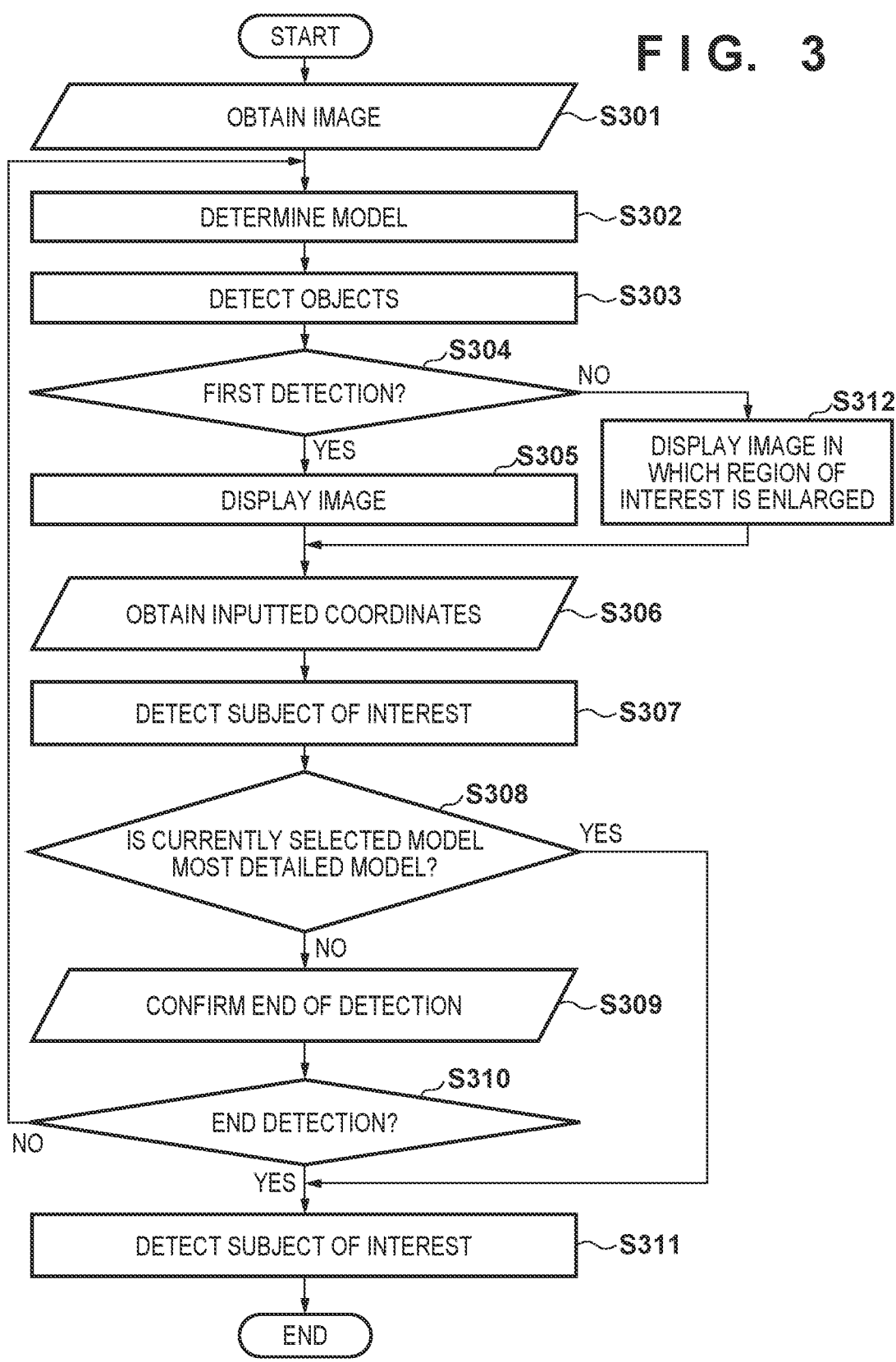
FIG. 3 is a flowchart of a process for determining a subject of interest according to the first embodiment.

FIG. 3 is a flowchart of a process for determining a subject of interest according to the first embodiment.

In step S301, the detection unit 202 obtains an image in which an object is captured from the storage unit 104.

In step S302, the detection unit 202 selects a trained model to be used for a process for detecting a subject of interest from among trained models related to the two machine learning models held in the model holding unit 201. When performing a process for detecting a subject of interest for the first time, the detection unit 202 selects a trained model whose region of interest for an object is the largest (granularity of detection object is the coarsest).

When it is determined No in a process of step S310 and the detection unit 202 performs a process for detecting a subject of interest for the second and subsequent times, the detection unit 202 selects a trained model whose region of interest for an object is smaller (granularity of detection object is finer) than the previously selected trained model.

In step S303, the detection unit 202 detects objects or specific parts belonging to various categories as objects from the image using the trained model selected in step S302. A result of detection of objects or specific parts is represented by coordinate information and likelihoods on the image.

In step S304, the display unit 204 determines whether or not a process for detecting objects in the image has been performed for the first time. When the display unit 204 determines that the process for detecting objects in the image has been performed for the first time (Yes in step S304), the process proceeds to step S305. When the display unit 204 determines that the process for detecting objects in the image has been performed not for the first time (No in step S304), the process proceeds to step S312.

In step S305, the display unit 204 displays, on the screen of the display unit 105, detection frames of objects or of specific parts belonging to various categories detected in step S303 superimposed on the image. Here, rather than displaying on the screen all the detection frames of objects or specific parts superimposed on the image, the display unit 204 may display only the detection frames of objects or of specific parts whose likelihoods exceed a predetermined threshold. When the display unit 204 determines that there is a large amount of noise due to the detection frames of objects or of specific parts, the display unit 204 can reduce the noise due to the detection frames of objects or of specific parts by limiting the detection frames of objects or of specific parts to be displayed on the screen. Since a trained model whose region of interest for an object is the largest is used in a process for detecting objects that is performed for the first time, the display unit 204 displays, on the screen, detection frames of objects belonging to various categories superimposed on the image.

In step S312, the display unit 204 displays, on the screen of the display unit 105, detection frames by superimposing them in a state in which a region surrounding a detected object is enlarged.

In step S306, the input unit 205 receives input information from the user via the screen of the display unit 105. The user selects a detection frame corresponding to an object or a specific part on which at least one of the tracking process, the AF process, and the counting process is to be performed from among the detection frames on the image displayed by the display unit 105. The input unit 205 converts position information at which the user's finger contacts the touch panel into coordinate information on the image.

In step S307, the detection unit 202 obtains a subject of interest (object of interest or specific part of interest) using the coordinate information on the image obtained in step S306 and the detection frames of objects or specific parts detected in step S303. The subject of interest is obtained, for example, based on the detection frame of an object or a specific part whose Euclidean distance between the coordinate information on the image and center coordinates of the detection frame of the object or the specific part is the shortest. Alternatively, the subject of interest may be determined by the user selecting one intended subject from a tree view, symbols, and the like displayed as an alternative to the detection frames of objects or of specific parts.

In step S308, the detection unit 202 determines whether or not the currently selected trained model determined in step S302 is a trained model whose region of interest for an object is the smallest among the trained models of the model holding unit 201. If it is determined that the currently selected trained model is a trained model whose region of interest for an object is the smallest (Yes in step S308), the detection unit 202 advances the process to step S311. If it is determined that the currently selected trained model is not a trained model whose region of interest for an object is the smallest (No in step S308), the detection unit 202 advances the process to step S309.

In step S309, the subject determination unit 203 determines whether or not the subject of interest obtained in step S307 is the final subject of interest. Here, the subject determination unit 203 receives an input operation from the user as to whether or not to terminate the process for determining a subject of interest.

In step S310, the subject determination unit 203 determines whether or not to terminate the process for determining a subject of interest based on a first determination condition and a second determination condition. The first determination condition is that "the user has selected to end the process for determining a subject of interest in step S309". The second determination condition is that "the size of the subject of interest selected in step S307 is smaller than a prescribed size of a subject of interest that has been set in advance". If the subject determination unit 203 determines that any of the first determination condition and the second determination condition is satisfied (Yes in step S310), the process proceeds to step S311. If the subject determination unit 203 determines that none of the first determination condition and the second determination condition is satisfied (No in step S310), the process returns to step S302 and the process for determining a subject of interest is continued.

In step S311, the subject determination unit 203 determines the subject of interest obtained in step S307 as the final subject of interest, stores the coordinate information of the subject of interest in the storage unit 104, and terminates the process for determining a subject of interest. Thereafter, the display unit 204 displays on the screen of the display unit 105 the detection frame of the subject of interest superimposed on the image. The subject determination unit 203 controls the tracking process, the AF process, and the counting process by instructing the image capturing apparatus (not illustrated) to perform at least one of these processes on the subject of interest.

First Variation of First Embodiment

In step S304, the display unit 204 need not determine whether or not a process for detecting objects in the image is being performed for the first time. That is, the input unit 205 performs the process of step S306 immediately after the process of step S303. Thus, rather than displaying, on the screen of the display unit 105, detection frames superimposed in a state in which a region surrounding a detected object is enlarged, the display unit 204 displays, on the screen, detection frames of detected objects superimposed on the original image.

Second Variation of First Embodiment

Figure 6A:
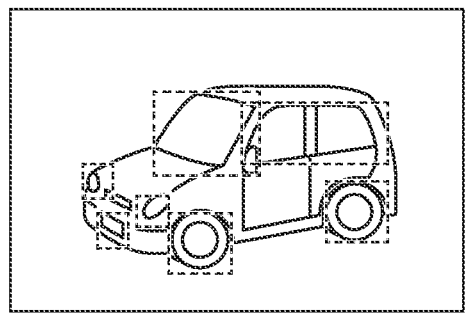
FIG. 6A is a diagram illustrating an example of integrating detection frames of a plurality of specific parts.
Figure 6B:
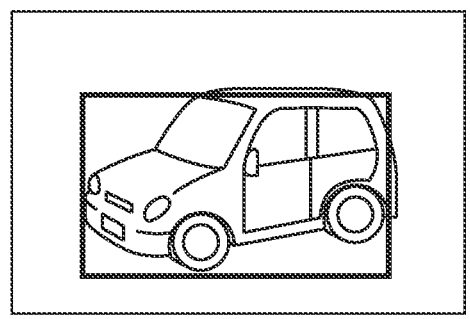
FIG. 6B is a diagram illustrating an example of integrating detection frames of a plurality of specific parts.
Figure 6C:
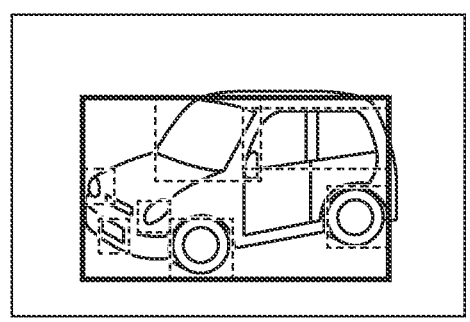
FIG. 6C is a diagram illustrating an example of integrating detection frames of a plurality of specific parts.

In step S307, rather than determining one subject of interest from a plurality of detection frames of specific parts detected in step S303, the detection unit 202 may calculate a detection frame of an object using detection frames of a plurality of specific parts. The detection frame of the object is, for example, calculated as a large detection frame (integrated detection result) in which detection frames of a plurality of specific parts have been integrated. FIGS. 6A to 6C are diagrams illustrating examples of integrating detection frames of a plurality of specific parts. FIG. 6A illustrates a composite image in which detection frames of a plurality of specific parts detected using the trained model B is superimposed on an image, and a plurality of detection frames indicated by broken lines indicate detection frames of specific parts. FIG. 6B illustrates a composite image in which a detection frame of an object calculated by integrating detection frames of a plurality of specific parts has been superimposed on an image, and a detection frame indicated by solid lines corresponds to the detection frame of the object. FIG. 6C illustrates a composite image in which all the detection frames including a detection frame of solid lines and detection frames of broken lines have been superimposed on an image. The detection frame indicated by solid lines in FIG. 6C is calculated so as to be of a minimum size while still including all of the broken line detection frames and the object (e.g., the car).

Although a description has been given for an example of calculating a detection frame of an object by integrating detection frames of a plurality of specific parts, a large detection frame (integrated detection result) in which a plurality of object detection results have been integrated may be calculated by the same method as described above. The display unit 204 then displays on the screen of the display unit 105 the calculated detection frame of the object (illustrated in FIG. 6B) or the detection frames of specific parts (illustrated in FIG. 6A) by superimposing them on the image. The input unit 205 receives input information from the user via the screen of the display unit 105. The user selects a detection frame corresponding to an object or a specific part on which at least one of the tracking process, the AF process, and the counting process is to be performed from the object detection frames or from the specific part detection frames on the image displayed by the display unit 105.

Third Variation of First Embodiment

In the process for determining a subject of interest, even if specific parts are detected in an image using the same trained model, detection frames of specific parts vary according to whether there is an additional process (e.g., setting of a threshold for likelihood for when displaying detection frames of specific parts). The detection unit 202 calculates the object detection frame illustrated in FIG. 6B based on the detection frames of specific parts illustrated in FIG. 6A detected by one trained model. In other words, when a detection frame of an object is newly calculated based on detection frames of a plurality of specific parts that vary according to an additional process, a size of a detection frame of an object to be calculated may vary even if the trained model for detecting specific parts is the same.

Therefore, rather than holding a plurality of trained models whose granularities of detection for an object are different from each other, the model holding unit 201 may hold only one trained model.

Fourth Variation of First Embodiment

Rather than obtaining coordinates from a position where the user's finger contacts the touch panel, the input unit 205 may obtain position information on an image using a non-contact technique, such as the user's line-of-sight information and gesture. The "user's line-of-sight information" means at least one pair of coordinates obtained by detecting the user's line of sight toward the display unit 105 by an image capturing apparatus or the like. The "non-contact technique" means a technique in which input operations are performed by the user without touching the screen or buttons. The non-contact technique is realized by using a sensing technique, such as sensors that utilize infrared rays and changes in electrostatic capacitance, image recognition by an image capturing apparatus, and speech recognition; a wireless control technique that utilizes a portable terminal (e.g., smartphone or tablet), and the like. The screens used in the non-contact technique may also be, for example, a non-contact touch panel and an aerial display.

Fifth Variation of First Embodiment

When the user performs an operation for changing a display of the screen of the display unit 105, the display unit 204 may change a currently selected trained model according to the user's input and display detection frames of objects or specific parts on the screen of the display unit 105. For example, when the user performs input of an enlarged display of an object on the screen of the display unit 105, the detection unit 202 changes the currently selected trained model A for detecting objects to the trained model B for detecting specific parts. The display unit 204 then displays detection frames of specific parts detected using the trained model B, superimposed on the image. On the other hand, when the user performs input for a reduced display of specific parts on the screen of the display unit 105, the detection unit 202 changes the currently selected trained model B for detecting specific parts to the trained model A for detecting objects. The display unit 204 then displays detection frames of objects detected using the trained model A, superimposed on the image.

As described above, according to the first embodiment, rather than detection frames of objects and detection frames of specific parts being displayed on the screen at the same time, the detection frames of objects or specific parts corresponding to a trained model of interest among a plurality of trained models are displayed in a stepwise manner. This makes it easier for the user to visually recognize objects or specific parts on the screen and thereby enabling an easy selection of an object or a specific part. Furthermore, it can be easily identified whether the user has intentionally selected an object or a specific part. According to the first embodiment, it is possible to accurately detect an objects or a specific part selected by the user on the screen.

Second Embodiment

A second embodiment detects in advance objects and specific parts from an image using a plurality of trained models and sets one of the plurality of trained models as a currently selected trained model. The second embodiment displays detection frames of objects or specific parts corresponding to the currently selected trained model on the screen. The second embodiment switches to another trained model by user input via a button or the like for switching from the currently selected trained model. Therefore, in the second embodiment, the user can select a specific part in a single coordinate specification without performing coordinate specification multiple times on the screen as in the first embodiment. Hereinafter, in the second embodiment, a description will be given for differences from the first embodiment.

Figure 4:
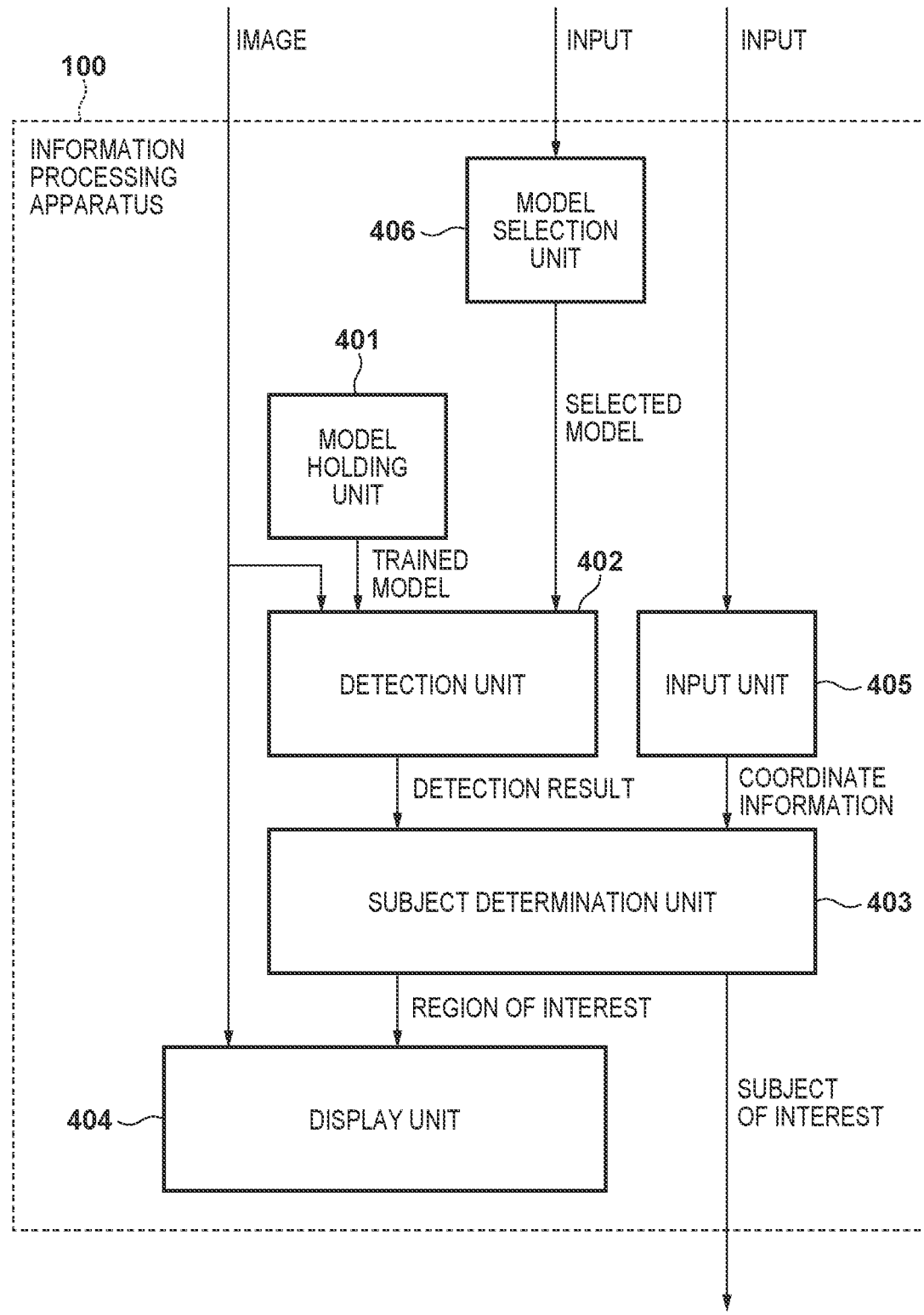
FIG. 4 is a diagram illustrating an example of a functional configuration of the information processing apparatus according to a second embodiment.

Since the hardware configuration of the information processing apparatus 100 is the same as that of the first embodiment, a description thereof will be omitted. FIG. 4 is a diagram illustrating an example of a functional configuration of the information processing apparatus according to the second embodiment.

The information processing apparatus 100 includes a model holding unit 401, a detection unit 402, a subject determination unit 403, a display unit 404, an input unit 405, and a model selection unit 406.

Since the model holding unit 401 has the same function as the model holding unit 201 and the input unit 405 has the same function as the input unit 205, descriptions thereof will be omitted.

Similarly to the detection unit 202, the detection unit 402 obtains a result of detection of objects or specific parts by detecting objects or specific parts from an image. The detection unit 402 differs from the detection unit 202 in that the number of trained models used in one detection process is large. That is, the detection unit 402 detects objects and specific parts from the image using all the trained models held in the model holding unit 401 in a single detection process. The model holding unit 401 holds a result of detection of objects and specific parts from the image by the detection unit 402. On the other hand, the detection unit 202 uses only one trained model selected in step S302 of FIG. 3 as the trained model to be used in one detection process.

When the detection unit 402 receives specification of a trained model to be selected from among the plurality of trained models held by the model holding unit 401 from the model selection unit 406, the currently selected trained model is changed to the specified trained model. The detection unit 402 transmits a result of detection of objects or specific parts detected using the newly selected trained model to the subject determination unit 403.

The subject determination unit 403 uses detection frames of objects or specific parts detected by a trained model of the detection unit 402 and coordinate information received from the input unit 405 to determine a detection frame of an object of interest or a specific part of interest specified by the user on the image. The detection frame of an object of interest or a specific part of interest is represented as an arbitrary shape, such as a rectangle or an oval, on the image, and the display unit 404 displays on the screen of the display unit 105 the detection frame of the object or the specific part superimposed on the image.

The display unit 404 displays the detection frames of objects or specific parts detected by the detection unit 402 and a detection frame of an object of interest or a specific part of interest determined by the subject determination unit 403 on the screen of the display unit 105.

The model selection unit 406 receives input of a user operation to the information processing apparatus 100 and outputs the received input to the detection unit 402. The input of a user operation is a selection of whether a trained model to be selected next is a trained model whose region of interest for an object is larger or smaller than the currently selected trained model. Upon receiving input of a user operation, the model selection unit 406 transmits the input of a user operation to the detection unit 402. In response to the input of the received user operation, the detection unit 402 changes the currently selected trained model to a new trained model.

FIG. 5 is a flowchart of a process for determining a subject of interest according to the second embodiment.

In step S501, the detection unit 402 obtains an image in which an object is captured from the storage unit 104.

In step S502, the detection unit 402 detects objects and specific parts from the image using all the trained models held in the model holding unit 401.

In step S503, the display unit 404 displays, on the screen of the display unit 105, detection frames of objects or specific parts detected by one trained model among the results of detection of objects and specific parts detected by the detection unit 402. When performing a process for detecting objects for the first time, the model selection unit 406 selects a trained model whose region of interest for an object the largest. Alternatively, the size of the region of interest to be displayed at the time of the first object detection process may be the size that has been set in advance by the user. In addition, when performing a process for detecting objects for the second and subsequent times after the process of step S506, the model selection unit 406 selects the trained model selected in step S506.

In step S504, the input unit 405 or the model selection unit 406 receives input information from the user.

In step S505, the detection unit 402 determines whether the input information is that of the input unit 405 or the model selection unit 406. If the detection unit 402 determines that the input information has been obtained from the model selection unit 406 (is trained model selection information), the process proceeds to step S506. On the other hand, if the detection unit 402 determines that the input information obtained from the input unit 405 is coordinate information on the image, the process proceeds to step S507.

In step S506, the model selection unit 406 changes the currently selected trained model to another trained model held by the model holding unit 401 using the model selection information obtained in step S504. The display unit 404 changes detection frames of objects or specific parts to be displayed on the screen of the display unit 105 according to the selected trained model, and the process returns to step S503. Descriptions for the processes of steps S503 to S505 will be omitted because they are the same as described above.

In step S507, the detection unit 402 detects a subject of interest using the coordinate information on the image obtained in step S504 and the detection frames of objects or specific parts according to the currently selected trained model. Similarly to the first embodiment, the subject of interest is obtained based on the detection frame of an object or a specific part whose Euclidean distance between the coordinate information on the image and center coordinates of the detection frame of the object or the specific part is the shortest. The subject determination unit 403 determines the subject of interest detected by the detection unit 402 as the final subject of interest, stores the coordinate information of the final subject of interest in the storage unit 104, and terminates the process for determining a subject of interest. Thereafter, the display unit 204 displays on the screen of the display unit 105 the detection frame of the subject of interest superimposed on the image. The subject determination unit 203 controls the tracking process, the AF process, and the counting process by instructing the image capturing apparatus (not illustrated) to perform at least one of these processes on the subject of interest.

First Variation of Second Embodiment

In step S503, the display unit 404 may switch detection frames of objects or specific parts to be displayed on the screen of the display unit 105 after a predetermined period of time has elapsed without receiving user input information via the model selection unit 406. For example, the display unit 404 displays detection frames of object on the screen of the display unit 105 and, after a predetermined period of time has elapsed since that display, displays detection frame of specific parts for all the objects on the screen. This allows the user to select a detection frame corresponding to an object or a specific part displayed on the screen without performing an operation for switching among trained models whose granularities of detection for an object are different from each other.

As described above, according to the second embodiment, switching from the currently selected trained model according to a user operation makes it possible to display, on the screen, detection frames according to trained models whose granularities of detection for an object are different from each other. Thus, information other than the information requested by the user can be eliminated on the screen, and only necessary information can be provided to the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-174824, filed Oct. 26, 2021, which is hereby incorporated by reference herein in its entirety.

What is claimed is:

1. An information processing apparatus comprising:
a display unit configured to switch which trained model, among a plurality of trained models whose granularities of detection for an object to be detected from an image are different from each other, is a trained model of interest, and display on a screen a result of detection by the trained model of interest;
a processor; and
a memory, including instructions stored thereon, which when executed by the processor, cause the apparatus to:
determine an object on which a predetermined process is to be performed based on a user operation on the result of detection by the trained model of interest,
wherein the plurality of trained models includes a first trained model for a first size of a region of interest for an object and a second trained model for a second size of a region of interest for the object smaller than the first size of the region of interest for the object of the first trained model, and display of the display unit is switched from a display corresponding to the first trained model to a display corresponding to the second trained model.

2. The information processing apparatus according to claim 1, wherein the display unit displays on the screen the result of detection by the trained model of interest selected by a user operation.

3. The information processing apparatus according to claim 1, wherein after a predetermined period of time has elapsed from when the display unit has displayed the result of detection by the trained model of interest superimposed on the image, the display unit switches the trained model of interest to another trained model of interest among the plurality of trained models and displays on the screen a result of detection by the another trained model of interest.

4. The information processing apparatus according to claim 1, wherein
the display unit performs a display on the screen in a format in which the object determined and the result of detection can be distinguished.

5. The information processing apparatus according to claim 1, wherein in a case where the display unit has received a user operation for performing a change of a display of the result of detection on the screen, in response to the change of the display, the display unit switches the trained model of interest to another trained model of interest among the plurality of trained models and displays on the screen a result of detection by the other trained model of interest.

6. The information processing apparatus according to claim 1, wherein the result of detection includes coordinate information of the object on the image and a likelihood, and
in a case where the likelihood exceeds a threshold, the display unit displays the result of detection on the screen.

7. The information processing apparatus according to claim 1, wherein
in a case where the display unit determines that a process for detecting an object on the image is performed not for a first time, the display unit displays on the screen a region surrounding the result of the detection selected by the user operation in an enlarged state, superimposed on the image.

8. The information processing apparatus according to claim 1, wherein
in a case where it is determined that a user operation for ending a process of determining the object has been received or the result of detection selected by the user operation is smaller than a size of an object that has been prescribed in advance, the selected result of the detection is determined as an object of interest.

9. The information processing apparatus according to claim 1, wherein
the first trained model whose granularity of detection for an object is coarse and the second trained model whose granularity of detection for an object is fine.

10. The information processing apparatus according to claim 1, wherein the predetermined process includes at least one of a tracking process, an AF process, and a counting process to be performed on the object determined and perform control for causing an image capturing apparatus to execute the predetermined process.

11. The information processing apparatus according to claim 1, wherein the result of detection includes a result of detection of at least one of an entirety of the object and a specific part of the object.

12. The information processing apparatus according to claim 1, wherein the user operation includes an operation based on at least one of position information of a user's finger that has contacted the screen, line-of-sight information of the user, and a gesture of the user.

13. The information processing apparatus according to claim 1, wherein the screen includes at least one of a touch panel, a non-contact touch panel, and an aerial display.

14. An information processing apparatus comprising:
a display unit configured to switch which of a result of detection by a trained model for detecting an object from an image and an integrated result of detection in which results of detection have been integrated is to be displayed for respective user operations, and display on a screen the result of detection or the integrated result of detection;
a processor; and
a memory, including instructions stored thereon, which when executed by the processor cause the apparatus to:
determine an object or another object,
which corresponds to the integrated result of detection, on which a predetermined process is to be performed based on a user operation on the result of detection or the integrated result of detection,
wherein the trained model is selected among a plurality of trained models,
the plurality of trained models include a first trained model for a first size of a region of interest for an object and a second trained model for a second size of a region of interest for the object smaller than the first size of the region of interest for the object of the first trained model, and display of the display unit is switched from a display corresponding to the first trained model to a display corresponding to the second trained model.

15. An image capturing system comprising:
an image capturing apparatus configured to capture an object; and
the information processing apparatus according to claim 1.

16. A method comprising:
switching which trained model, among a plurality of trained models whose granularities of detection for an object to be detected from an image are different from each other, is a trained model of interest, and displaying on a screen a result of detection by the trained model of interest; and determining an object on which a predetermined process is to be performed based on a user operation on the result of detection by the trained model of interest, wherein the plurality of trained models include a first trained model for a first size of a region of interest for an object and a second trained model for a second size of a region of interest for the object smaller than the first size of the region of interest for the object of the first trained model, and display of a display unit is switched from a display corresponding to the first trained model to a display corresponding to the second trained model.

17. A non-transitory computer-readable storage medium storing a program that, when executed by a computer, causes the computer to perform a method comprising:

switching which trained model, among a plurality of trained models whose granularities of detection for an object to be detected from an image are different from each other, is a trained model of interest, and displaying on a screen a result of detection by the trained model of interest; and determining an object on which a predetermined process is to be performed based on a user operation on the result of detection by the trained model of interest, wherein the plurality of trained models include a first trained model for a first size of a region of interest for an object and a second trained model for a second size of a region of interest for the object smaller than the first size of the region of interest for the object of the first trained model, and display of a display unit is switched from a display corresponding to the first trained model to a display corresponding to the second trained model.

18. The information processing apparatus according to claim 1, wherein the display of the display unit is switched from the display corresponding to the first trained model to the display corresponding to the second trained model by enlarging a detected object.

19. The information processing apparatus according to claim 1, wherein the first trained model detects the whole of the object and the second trained model detects a part of the object.

* * * * *